Feb. 5, 1946.  W. F. HOLIN  2,394,382
BRAKE RIGGING
Filed Aug. 7, 1943

Inventor
William F. Holin
By Blackmor, Spencer & Flint
Attorneys

Patented Feb. 5, 1946

2,394,382

UNITED STATES PATENT OFFICE 2,394,382

BRAKE RIGGING

William F. Holin, North Riverside, Ill., assignor to General Motors Corporation, Detroit, Mich., a corporation of Delaware Application August 7, 1943, Serial No. 497,737

5 Claims. (Cl. 188—230)

This invention relates to improvements in brake rigging for railway vehicles, and has for an object the provision of such a construction wherein the brake head which carries the shoe that engages the wheels is supported on and associated with its actuating lever in such manner that when the brakes are in released position, the end of the shoe which the tread of the wheel first encounters when the latter is rotating in a forward direction, which I will refer to as the leading end, will be further away from the tread of the wheel than is the opposite end, which I will call the trailing end, so that as the shoe is moved toward the wheel during the brake applying action, the trailing end of the shoe will come into contact with the wheel first.

This is desirable in certain types of brake rigging wherein the location of the pivot points of the brake levers relative to the center of the wheels is such that if the face of the shoe is concentric with the tread of the wheel when the brakes are in released position, the leading corner of the shoe will engage the wheel first and will tend to dig into the tread thereof, with consequent noise and damage to the wheel and/or shoe. In my improved construction, since when the brakes are in released position, the leading end of the shoe is held further away from the tread of the wheel, during the brake applying movement the trailing end of the shoe will engage the wheel first so that there is no possibility of the corner of the shoe tending to dig into the tread of the wheel. After the trailing end of the shoe has engaged the wheel, the shoe and the head which carries it are swung around by the brake applying force to a position wherein the shoe will be concentric with the wheel, so that its entire face may contact the tread of the wheel. When the brakes are released, spring means serves to swing the head on the shoe around again to a position wherein the leading end of the shoe will be further away from the wheel than the trailing end.

Another object of the invention is to make provision for the brake head to automatically change its position relative to the lever upon which it is supported as wear of either the shoe or the wheel takes place, in order that the shoe will always be able to assume a position concentric with the wheel when the brakes are applied, and a position wherein its leading end will be further away from the wheel tread when the brakes are released. This change of position of the brake head relative to the lever is necessitated because of the fact that as wear of either the shoe or the wheel occurs, the angular position that the brake lever assumes when the brakes are applied changes, since as more wear takes place the lever must be swung closer to the center of the wheel.

Other objects and advantages of my invention will be apparent upon reference to the specification and accompanying drawing, in which.

Figure 1:
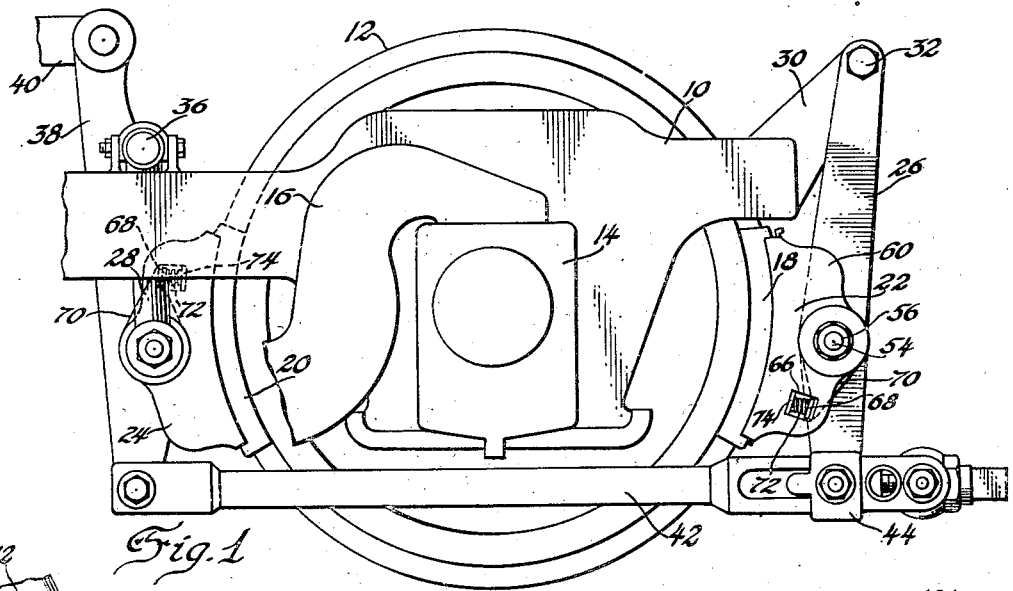
Fig. 1 is a side elevational view of one end of a railway vehicle truck, showing my invention associated with the brake rigging for one of the wheels.

The reference numeral 10 indicates the frame of a railway vehicle truck, in which the axle carrying the wheels 12 is journalled in the usual manner in journal boxes 14, and 16 is an equalizer bar, the ends of which are supported upon the top of the journal boxes. The brake arrangement shown is of the well-known clasp type, and consists of brake shoes 18 and 20 adapted to be forced against opposite sides of the wheel, the shoes being supported upon brake heads 22 and 24 respectively. The brake head 22 is pivotally secured to a dead truck lever 26 by a form of connection to be presently described, while the brake head 24 is pivotally secured to hanger 28 by a similar form of connection. The lever 26 is pivotally secured to bracket 30 by a pin 32, while the hanger 28 is pivotally supported on the frame at 36. A live truck lever 38, which is connected by a rod 40 to a source of power (not shown) for applying the brakes, is also pivotally connected to the brake head 24, and has its lower end pivotally connected to a pair of straddle bars 42, the opposite ends of which are connected by a slack adjuster 44, of the type disclosed in Blomberg patent 2,246,340, issued June 17, 1941, to the lower end of the lever 26.

Figures 3, 5:
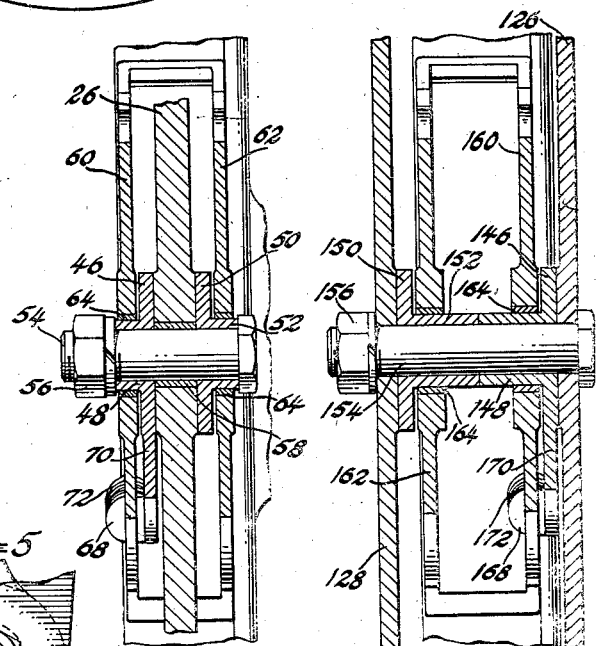
Fig. 3 is a sectional view, taken on the line 3—3 of Fig. 2.
Fig. 5 is a sectional view, taken on the line 5—5 of Fig. 4.

As best shown in Fig. 3, a flange 46 on a bushing 48 bears against one side of lever 26, while a flange 50 on a bushing 52 bears against the opposite side thereof. A bolt 54 extends through these bushings and nut 56 threaded on the bolt serves to draw the flanges on the bushings tightly against the lever. A bearing member 58 of antifriction material is pressed into the opening in the lever that the bolt passes through, to permit the lever to move freely relative to the bolt.

The side walls 60 and 62 of the brake head have holes formed in them, and bearing members 64 of anti-friction material which are pressed in these holes fit over the bushings 48 and 52 so that the brake head is pivotally supported thereon. The side wall 60 has an opening 66 formed in it, and extending into this opening is a projection 68 on an arm 70 which is formed as a part of the bushing 48, extending downwardly therefrom. A compression spring 72 is located in the opening 66, one end bearing against a seat portion 74 formed in the wall 60 at the end of the opening, the other end of the spring bearing against the projection 68.

Figure 2:
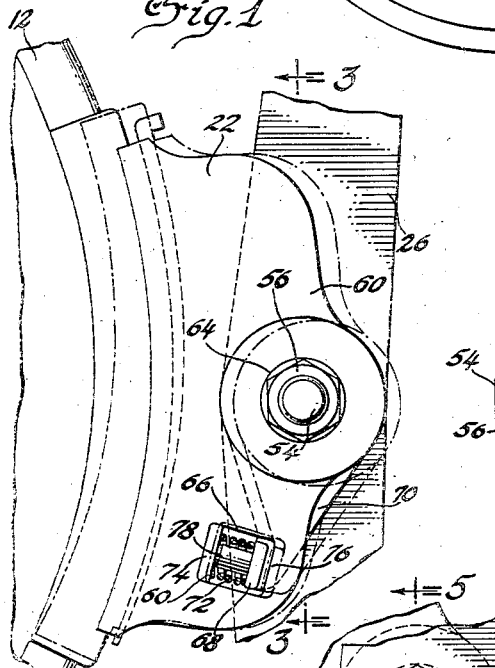
Fig. 2 is a fragmentary side elevational view, on a larger scale, of the portion of the brake rigging which embodies my invention.

When the brakes are in released position, the compression spring 72 serves to swing the brake head around its bearings on the bushings 48 and 52 in a clockwise direction as viewed in Fig. 2, so that it assumes the position shown in dot-and-dash lines in that figure, in which position the upper or leading end of the shoe is held further away from the tread of the wheel than is the lower end. This prevents the leading corner of the shoe from tending to dig into the wheel when the brakes are applied. To limit the amount of swinging movement of the upper end of the shoe away from the wheel, the opening 66 is made of such length that its edge 76 will come into contact with the projection 68 when the desired amount of swinging movement has been reached.

As the brakes are applied, it will be seen that the lower or trailing edge of the shoe will come into contact with the tread of the wheel first, which will cause the brake head to swing around in a counterclockwise direction as viewed in Fig. 2, until the entire face of the shoe bears evenly against the wheel. This of course causes the spring 72 to become compressed, but before it can become completely compressed, the seat portion 74 will engage the end of a pin 78 which is secured in the projection 68, thereby preventing further swinging movement in this direction of the brake head about its pivotal mounting on the bushings 48 and 52. When the brakes are released, the spring 72 will cause the brake head to swing around again to the dot-and-dash line position shown in Fig. 2, in order that the leading corner of the shoe will not engage the tread of the wheel first as the shoe is moved toward the wheel as the brakes are applied.

As the brake shoes and the wheels become worn during use, it of course becomes necessary to move the lever 26 closer to the wheel to apply the brakes, thereby gradually changing the angular position that the lever assumes relative to the wheel when the brakes are applied. Since the position of the brake head relative to the wheel when the brakes are applied remains substantially the same, it becomes necessary for the head to change its position relative to the lever as such wear occurs. This is accomplished in the following manner. When the brakes are applied, the trailing end of the brake shoe engages the wheel first, causing the brake head to swing in a counterclockwise direction as viewed in Fig. 2. If the shoes or the wheels have become worn, the seat portion 74 on the head will engage the end of the pin 78, and further movement of the lever toward the wheel will cause the arm 70 to be swung away from the wheel a distance sufficient to permit the head to assume a position wherein the face of the shoe will be concentric with the tread of the wheel. This movement of the arm 70 is permitted when sufficient pressure is applied to it, by slippage of the flange 46 relative to the face of the lever 26, the flange normally being prevented from moving relative to the lever because of its being drawn firmly against the lever by the bolt 54 and nut 56. When enough force is applied, however, the friction between the face of the flange and the lever is overcome and the flange can slip relative to the lever to allow the arm to swing in a counterclockwise direction, as viewed in Fig. 2, to a new position wherein when the brakes are applied the head may rock about its pivot point so that the face of the shoe will be concentric with the tread of the wheel. It will be understood that normally there is no movement of the bushing 49 relative to the lever, there being sufficient friction between the face of the flange 46 and the lever to prevent such movement, and it is only when an appreciable amount of wear of the brake shoes or wheels has occurred that the bushing will be swung to a new position by the force exerted during the brake applying movement.

As shown in Fig. 1, while in connection with brake head 22 the arm 70 and spring 72 are located below the point where the head is pivotally supported on the brake lever, in connection with brake head 24 these parts are located above said pivotal point, this being because the leading end of shoe 20 is the lower end whereas in the case of shoe 18 the upper end is the leading end, due to the shoes being located on opposite sides of the wheel. Otherwise the structure for connecting the brake head 24 to the lever 38 is the same as that shown in Figs. 2 and 3.

Figure 4:
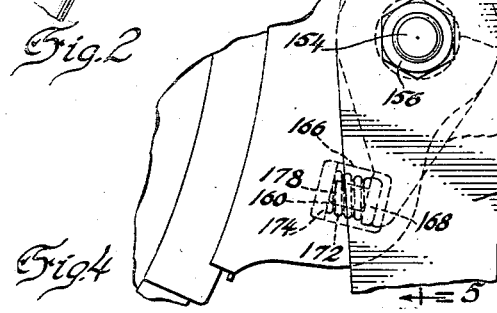
Fig. 4 is a view similar to Fig. 2, but showing a modified form of my invention.

In Figs. 4 and 5 there is shown another form of my invention which may be employed when two spaced brake levers 126 and 128 are used. In this case, the bushings 148 and 152 are clamped between the levers by a bolt 154 and nut 156, which results in there being considerable friction between the lever 126 and flange 146 on bushing 148, and between lever 128 and flange 150 on bushing 152. The arm 170 extending downwardly from flange 146 has a projection 168 which is received in opening 166 formed in the side wall 160 of the brake head, and compression spring 172 extends between projection 168 and seat portion 174 on the side wall, a pin 178 carried by the projection being adapted to be engaged by the seat portion to move the arm 170 and thereby the bushing 148 to a new position when the shoes or wheels have become worn to such an extent that the face of the shoe cannot become concentric with the tread of the wheel when the brakes are applied.

The operation of this form of the invention is the same as that first described, the principal differences between the two structures being that in the form shown in Fig. 5 the bushings are clamped between two levers instead of being clamped against opposite sides of a single lever as in the form shown in Fig. 3, and in the construction of Fig. 5 the side walls 160 and 162 of the brake head fit between the flanges 146 and 150 of the bushings 148 and 152 respectively, being journalled on the bushings by means of bushings 164 which are press-fitted in the side walls.

In both of the forms described, it will be seen that when the brakes are released and the lever moves away from the wheel, the compression springs will cause the brake heads to swing around their pivotal mountings on the bushings which are frictionally clamped against the lever, so that the upper ends of the shoes will be moved away from the tread of the wheel first. As the releasing movement continues, the end of the slot in the brake head comes into contact with the projection on the arm extending downwardly from the bushing, which prevents further swinging movement of the head relative to the lever. Further movement of the lever away from the wheel serves to pull the entire face of the shoe out of contact with the wheel, the leading end of the shoe, however, being further away from the wheel tread than is the bottom, so that when the brakes are applied and the shoe is again moved toward the wheel, the trailing end of the shoe will come into contact with the wheel first, thus preventing the leading corner of the shoe from tending to dig into the tread of the wheel.

It will be understood that the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a brake rigging, the combination of a lever, a bushing having a flange formed thereon, a bolt extending through said lever and said bushing, a nut threaded on said bolt serving to clamp said flange in frictional engagement with said lever, a brake head provided with a pair of side walls pivotally mounted on said bushing, one of said side walls having an aperture extending therethrough, an arm projecting outwardly from said flange and extending into said aperture, and resilient means located in said aperture between one edge thereof and said arm acting to swing one end of said head away from the lever, another edge of said aperture being adapted to engage said arm to limit such swinging movement.

2. In a brake rigging, the combination of a lever, a pair of bushings each having a flange formed thereon, a bolt extending through said lever and said bushings, a nut threaded on said bolt serving to clamp said flanges in frictional engagement with said lever, a brake head pivotally mounted on said bushing, said head having a rectangularly shaped opening formed therein, an arm projecting outwardly from one of said flanges, the outer end of said arm extending into said opening, and resilient means located in said opening between one end thereof and said arm acting to swing one end of said head away from the lever, another end of said opening being adapted to engage said arm to limit such swinging movement.

3. In a brake rigging for a vehicle wheel, a lever, a bushing having a flange formed thereon, a bolt extending through said lever and said bushing, a nut threaded on said bolt serving to clamp said flange in frictional engagement with said lever, a brake head pivotally mounted on said bushing, a brake shoe carried by said head, an opening formed in said head, an arm projecting outwardly from said flange and extending into said opening, and a compression spring located in said opening between one edge thereof and said arm and serving when the brakes are released to rotate said head to a position wherein one end of the brake shoe will be further away from the wheel tread than the other end, the other edge of said opening being adapted to engage said arm to limit such rotative movement of said head.

4. In a brake rigging for a vehicle wheel, a lever, a bushing having a flange formed thereon, a bolt extending through said lever and said bushing, a nut threaded on said bolt serving to clamp said flange in frictional engagement with said lever, a brake head pivotally mounted on said bushing, a brake shoe carried by said head, an opening formed in said head, an arm projecting outwardly from said flange and extending into said opening, a compression spring located in said opening between one edge thereof and said arm and serving when the brakes are released to rotate said head to a position wherein one end of the brake shoe will be farther away from the wheel tread than the other end, and means carried by said arm adapted to be engaged by said edge of the opening, when the shoe or the wheel becomes appreciably worn, to cause said arm and the bushing to which it is attached to be moved to a new angular position relative to the lever in order that the face of the shoe may always be concentric with the wheel tread when the brakes are applied.

5. In a brake rigging for a vehicle wheel, a lever, a bushing having a flange formed thereon, a bolt extending through said lever and said bushing, a nut threaded on said bolt serving to clamp said flange in frictional engagement with said lever, a brake head pivotally mounted on said bushing, a brake shoe carried by said head, an opening formed in said head, an arm projecting outwardly from said flange and extending into said opening, a compression spring located in said opening between one edge thereof and said arm and serving when the brakes are released to rotate said head to a position wherein one end of the brake shoe will be farther away from the wheel tread than the other end, and a projection extending from said arm within the opening, said projection being adapted to be engaged by said edge of the opening, when the shoe or the wheel becomes appreciably worn, to cause said arm and the bushing to which it is attached to be moved to a new angular position relative to the lever in order that the face of the shoe may always be concentric with the wheel tread when the brakes are applied.

WILLIAM F. HOLIN.